Oct. 4, 1966    A. R. WELLS    3,277,277
THERMOSTATICALLY CONTROLLED ELECTRIC IMMERSION HEATER UNIT
Filed Aug. 10, 1965    2 Sheets-Sheet 1
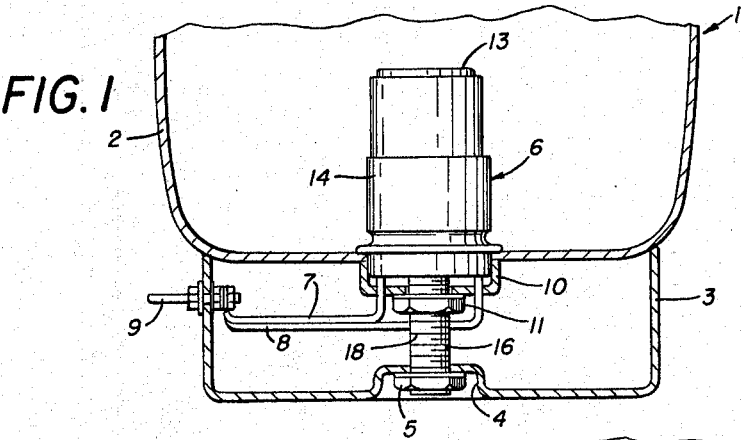
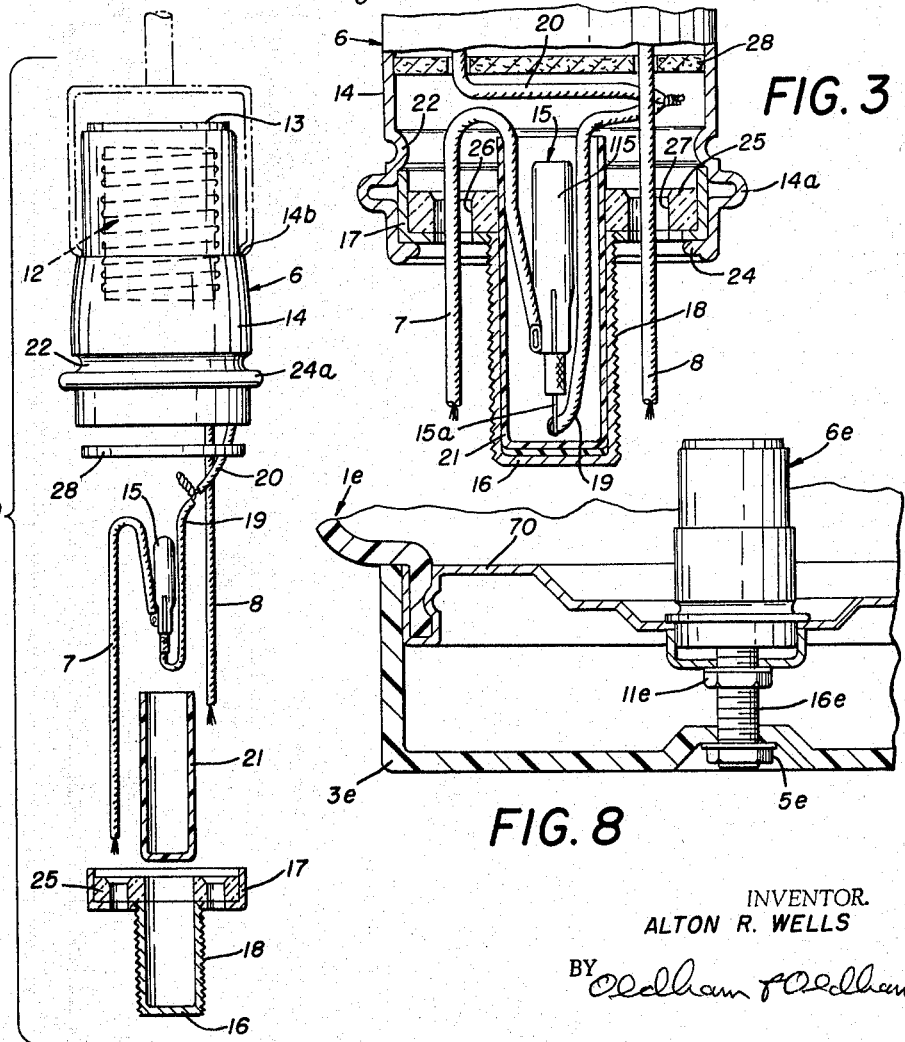
INVENTOR.
ALTON R. WELLS
BY Oldham & Oldham
ATTORNEY INVENTOR.
ALTON R. WELLS
BY Oldham & Oldham
ATTORNEY

United States Patent Office

3,277,277
Patented Oct. 4, 1966

3,277,277
THERMOSTATICALLY CONTROLLED ELECTRIC
IMMERSION HEATER UNIT
Alton R. Wells, 4573 W. Trade Winds Ave.,
Lauderdale-by-the-Sea, Fla.
Filed Aug. 10, 1965, Ser. No. 478,657
17 Claims. (Cl. 219—441)

This application is a continuation-in-part of my application Serial No. 263,144, filed March 6, 1963, and now abandoned.

This invention relates to a combined heater and thermostat unit and to a container assembly including such unit, especially to a compact immersion type electrical heater and control means unit, such as is adapted for use in coffee percolators, electric water heaters, and the like, and to the assembly formed when the unit is assembled in a small electrical applaince.

In making coffee, most people desire to make it in automatically controlled electric percolators. These percolators require an immersion heater element therein and usually they also have had a thermostat provided for controlling the flow of power to the heater to control the coffee making operation.

These immersion heaters and controls as provided heretofore have required larger base areas in the coffee percolator, or electric hot water heaters than that required for just the heater alone, as the thermostat normally has been secured to a portion of the container base adjacent the heater. This sometimes is undesirable where a small capacity heating device is desired, or where a small area is desired for the base of the coffee percolator. Furthermore, external connections are required between the heater element and the thermostat, or other control means, which external connections can work loose, or become unsatisfactory after a period of service. Immersion of the unit for cleaning, washing, or the like is impractical unless the thermostat control and wiring is contained within a sealed base unit, which is expensive, difficult to assemble, and presents a possible danger in losing its seal in service.

In coffee percolators or the like, it is very important that the heat supply thereto be cut off very rapidly, if the container runs dry, or is started with no liquid therein, or if excessive temperatures are starting to be created in the container, or its contents. Prior units have been relatively slow and unsatisfactory in such cut-off action.

The general object of the present invention hence is to provide a novel and improved combination immersion heater and control means therefor characterized by the fact that such heater and control means is relatively simple and uncomplicated in its assembly in an electric percolator or the like and has only two exposed leads extending from the heater and control unit for connection to a power supply source.

Another object of the invention is to provide an electric heater and control thermostat unit of a minimum external diameter for positioning in containers of a small base area, and to provide a good heat flow relation between the contents of the container and the thermostat to obtain rapid cut-off action of power supply to the unit when excessive temperatures are created in the container by the heater.

Another object of the invention is to provide a package unit for electric heating and control action, which unit has a thermostat positioned therein in a novel manner and which unit is much simpler to assemble and install in a commercial water heating unit than prior constructions, as no special wires, clips, or other similar means, are required to connect, or position the thermostat.

Another object of the invention is to provide a novel and improved heater and hollow support stud unit where the stud can be designed to receive any known type of a thermostat for conventional control actions, and where the thermostat is in good heat flow relation to the walls of the stud.

Yet another object of the invention is to provide a substantially conventional size electric heater unit, which has a relatively high but safe temperature and wattage output, with a thermal insulator positioned intermediate the heater and the base portion of the heater case so that by use of a novel base plate having a tubular, hollow stud thereon, a thermostat means can be positioned completely within and usually substantially fills such tubular stud for control of power flow to the heater.

A further object of the invention is to provide an immersion heater and stud unit of the class described, which unit has a thermostat mounted within it and controlled primarily by the temperature of the contents of the appliance with which it is used, with only a small lag of the thermostat in relation to the temperature of the contents of the appliance.

Still a further object of the invention is to provide a control means in a combined electrical heater, stud and control unit wherein the sensitivity and action of the thermostat can be adjusted by separate external means to control power flow and obtain the desired temperature calibration in the unit, and where the components of the unit are relatively inexpensive to produce, handle and install, and generally are of standard construction but cooperate to provide a novel combined unit having desirable properties.

Another object of the invention is to position a thermostat in a confined area at the base of a heating appliance where the temperature of the confined area is responsive to the temperature of the contents of the heating appliance and the thermostat rapidly senses the temperature of the confined area.

The foregoing and other objects and advantages of the invention will be made more apparent as the specification proceeds.

For a better understanding of the present invention, reference now should be had to the accompanying drawings, wherein:

FIG. 1 is a fragmentary vertical section through an electric percolator unit having a combined heater and thermostat unit of the invention assembled therein;

FIG. 2 is an exploded view of the combined heater and thermostat means as prepared for assembly in accordance with the principles of the present invention;

FIG. 3 is a fragmentary, enlarged vertical section through the base portion of the heater and thermostat unit of FIG. 1;

FIG. 8 is a fragmentary vertical section of a further embodiment of the invention.

When referring to corresponding members shown in the drawings and referred to in the specification, corresponding numerals are used to facilitate comparison therebetween.

Figure 4:
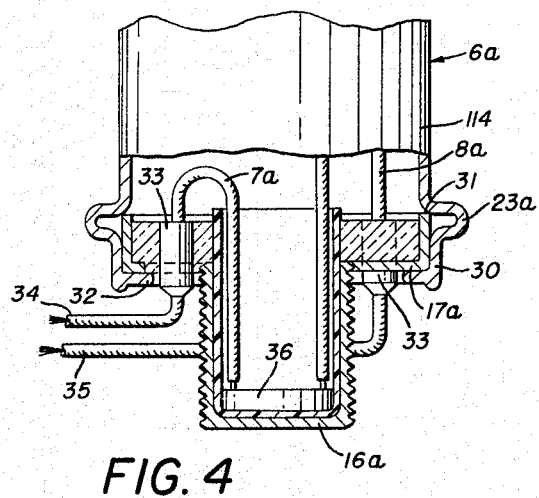
FIG. 4 is a fragmentary vertical section of a modified sealed thermostat and heater unit embodying the principles of the invention.

The present invention, generally speaking as to one embodiment thereof, relates to a combined electrical heater and thermostat unit including a metal case having a closed end and an open end, a wire heater means positioned in the case usually adjacent the closed end thereof and having a pair of leads extending therefrom, a metal heater base, or base plate having a hollow closed end projection thereon secured to the open end of the metal case and extending downwardly therefrom, and a thermostat received within the projection and having a pair of leads extending therefrom, the wire heater means being connected in series with the thermostat internally of the metal case unit so that only two leads extend from the unit for power supply thereto.

Attention now is particularly directed to the details of the structure shown in the accompanying drawings, and a typical electric percolator is indicated as a whole by the numeral 1, and includes a container 2, which may be made from a material, such as aluminum or other suitable material. A cup-shaped base 3, which may be made from plastic material, or other suitable substance and is made from any suitable material, is shown removably attached to the bottom of the container 2 by conventional members, such as a nut 5, received in a base recess 4, that engages an electric heater and thermostat or control unit indicated as a whole by the numeral 6. Leads 7 and 8 are shown extending from the unit 6 to connect to conventional pronged connectors, or terminals 9 suitably secured to the base 3 of the electric percolator 1.

It is an important feature of the present invention that the heater and thermostat unit 6 will provide a substantially conventional wire heater, or unit 12 that may be substantially localized adjacent the upper, or closed end 13 of a metal case 14 in which the heater is positioned. This heater 12 may be of the type shown in Russell L. Schwing United States Letters Patent No. 2,864,929, in which the electric heater may be positioned, for example, on a cylindrical core and be embedded in some suitable insulation and heat transfer body to hold the wire heater and core member in a fixed position within the metal case 14. A thermostat 15, which is of standard construction, for example, of the type shown in United States Letters Patent No. 2,866,041 or other similar means, is operatively positioned in and substantially fills a tubular projection, or stud 16 formed on or fixedly or removably secured to a metal heater end disc or plate 17. The end disc, or plate 17 is used to close the open, and usually lower end, of the metal shell or case 14. This projection 16 usually extends downwardly in its normal position and has a closed lower end. The projection 16 has threads 18 on its periphery. The metal case 14 has a flange 14a in sealed engagement with the bottom of the container so that the heater contacts the liquid in the container and the stud 16 is out of contact with such contents. The thermostat 15 usually is of the type thatt has a heat sensitive bimetal arm or strip (not shown) extending thereinto from a sealed end thereof as a cantilever positioned to change its shape and to control a circuit formed through the thermostat, under predetermined elevated temperature conditions. A terminal strip 15a extends from the initially open end of a metal case 115 for the thermostat, which case preferably has one permanently closed end. Usually the thermostat 15 would open a power circuit under an elevated temperature. Thus a pair of leads 7 and 19 are shown extending from the thermostat 15, which in this instance is of the type having a current conductive case, but with other types of thermostats having insulated cases likewise naturally being suitably for use in the invention. The lead 7 is suitably secured to the metal case 115 and the lead 19 connects to the terminal strip 15a. The thermostat 15 usually is of generally oval shape in cross section and it may be frictionally received within and held in the projection 16, as by the leads 7 and 19 engaging an insulation sleeve 21 positioned within the projection 16 and usually also extending axially upwardly from the end disc 17, as shown in FIG. 3.

FIG. 3 of the drawings clearly shows that only two leads 7 and 8 extend from the heater and thermostat unit and with the lead 7 connecting to the thermostat 15 and with the opposite lead 19 extending from the thermostat connecting to the heater, as by a lead 20 extending from the heater. The opposite lead 8 connects to the heater for power flow to the heater unit by the leads 7 and 8, which power flow will be interrupted by the thermostat 15 when it is open. The insulation sleeve 21 can be cemented within the projection 16, or be frictionally secured, or be merely positioned therein, as desired. Such sleeve 21 is relatively thin to permit rapid heat flow therethrough, and the thermostat 15 substantially fills the stud 16 to be in good heat flow relation to the walls of the stud.

A positioning cap 10 is shown carried by the stud 16 to secure the heater and thermostat unit 6 to the bottom of the container 2. A nut 11 draws the unit 6 into sealed engagement with the container. However, the heater may be operatively secured to the container 2 in any known manner.

Usually it is necessary that the end plate or disc 17 is in good frictional engagement with the metal case 14 and thus an annular rib 22 is shown extending radially into the metal shell 14 adjacent the initially open end thereof to provide a stop for the end disc. The seating flange 14a is formed immediately axially below such rib 22. A lower edge 24 on the metal case 14 is spun over to hold this end disc or base plate 17 in position. If desired, knurled edge portions (not shown) may be provided on the end disc 17 where the edge 20 is spun thereover to obtain good frictional fit therebetween and prevent any movement of the end disc.

Preferably insulation means are present in the heater and thermostat unit 6 so that a porcelain, or mica disc 25, or similar insulation member is carried by the end disc 17 on its inner surface, or formed integrally therewith by deposit thereon. The insulating disc 25 may be frictionally or adhesively secured in position to shield the end plate or disc from direct heat flow to it from the heater 12. Holes 26 and 27 are provided in the disc 25 for the leads 7 and 8 and similar holes are formed in the end plate. An asbestos disc 28 or other insulation member of substantially the same cross sectional area of the metal case 14 is also provided in a dead air space formed in the case intermediate the thermostat 15 and the heater 12 to prevent direct heat flow therebetween, and the leads 20 and 8 extend through small holes therein.

By the use of the heater and thermostat unit 6 of the invention, very effective control action can be provided for coffee making action. The heater unit 12, which is of any desired construction, may be rated, for example, up to 1,000 watts heating capacity. Usually the metal case 14 is made from aluminum, for low wattage requirements and from stainless steel for higher wattage use.

It is a further feature of the invention that the sensitivity of the thermostat 15 can be controlled by varying the size, or mass of metal provided in the nut 5. It will be seen that the thermostat 15 is positioned in the heater and thermostat unit 6 with a portion of the thermostat adjacent this nut 5. The nut 5 is exposed to the ambient temperature inside the base 3, or to that of the surrounding atmosphere, dependent upon the construction of the base 3. The stud, or projection 16 is likewise exposed to the ambient temperatures in the enclosed area or "oven" formed by the base 3. By having more or less mass of metal in the nut 5 immediately adjacent the thermostat 15, the rate of temperature variation of such nut with the water being heated will provide some control for the temperature conditions effecting the thermostat 15. Hence, a control is provided to balance minor production variations in the calibration of the thermostat and in the watts output of the heater 12 and/or the interrelation of these two members. The base 3 may have apertures therein adjacent the nut 5 and/or the recess 4 may extend farther up into the base, if desired, to aid in making the nut responsive to "oven" temperature. Or, while the sides of the base are usually continuous, the base thereof could be spider-like to facilitate heat flow to the nut 5.

Under stabilized conditions, the external temperature of the metal heater case 14 approaches the temperature of the water in the container 2, and/or the lower portion of the metal case is at substantially the temperature of the bottom wall of the container and the air in the enclosure formed by the base 3. Thus, the present invention provides a means for sensing temperatures within this projection member 16, or equivalent, which projection is out of contact with the liquid in which the heater is immersed, but which is sensible to and controlled by the temperature of the liquid. The fact that the projection carried by the metal case is in good heat exchange relationship with the metal case facilitates heat flow to the projection from the metal case to heat the projection to about the case temperature, under dry run or safety cut-out conditions.

Any desired insulation means may be used in association with the thermostat, or it may be in direct contact with the projection 16 if the thermostat casing is either non-conductive, or is not a part of the thermostat control circuit. Likewise, the thickness and composition of the porcelain disc 25 and of the insulation disc 28 may vary to provide more or less insulation of the thermostat 15 from the heater 12. The end disc or plate 17 and the projection, or support stud 16 may be made integrally, if desired, or may be made from two separate members suitable secured together, as shown.

It will be realized that an immersion heater of the type of the invention is adapted to have conventional coffee percolator means, such as a canopy or pump and means carried thereon, engaged with the protruding upper end portion of the heater case, as positioned in the coffee percolator. Usually the unit of the invention would have a tolerance of about 2 to 5° in the temperature required for opening or closing the circuit through the thermostat, usually in the range of about 185° to 190° for the coffee making process, or other suitable temperature for other liquids.

The drawings clearly show that the metal case 14 may have an upwardly facing shoulder 14b provided thereon intermediate the top and bottom or at the lower end of the electric heater unit of the invention. Such shoulder 14b can be varied in its spacing axially of the metal case 14 and is adapted to have the lower end of the canopy, or pump means for the percolator engaged therewith in a predetermined amount of overlapping association with the heater 12. Likewise, the smaller amount of heat generated in the lower portion of the heater 12 below the shoulder 14a will primarily flow into the liquid received in the container 2 and contacting the lower portion of the metal case 14. Thus, a positive and controlled correlation or division of heat can be obtained between the overall heating action for the contents of the container 2 and the pumping, or coffee percolating action obtained in the percolator 1.

From the foregoing description of the novel unit of the invention, it will be seen that the appliance, such as an electric percolator in which the electric heater and control unit 6 of the invention is positioned, needs only have a bottom large enough to engage the lower portion of the metal case 14, as there are no other components required on this unit, and a very small base container can be provided.

Tests with units made in accordance with the principles of the invention have shown that a very desirable heat control action is obtained in the heater and thermostat unit 6 when the thermostat 15 is positioned with its closed end being the upper end adjacent the heater 12 and with its initially open end being the lower end spaced further from the heater 12 so that the bimetal strip in the thermostat is protected by the additional distance the terminal strip 15a is positioned from the heater coil 12.

The heater and thermostat, or control unit 6 of the invention has proven by test that it is very effective in providing a rapid shut-off action for flow of power to the heater 12 should the container 2 run dry of liquid contents, or if it should inadvertently be started without any liquid therein. This unique characteristic of the heater and control unit of the invention achieves a much more rapid safety action than prior constructions because of the integral construction of the heater 12, the metal case 14, and the thermostat or thermal control 15. Under dry abuse conditions, a very fast heat flow action is obtained to the stud or extension 16 that is in good heat exchange engagement with the case 14. Such more rapid control action by the means of the invention permits the use of a higher wattage rating heater 12 than in equivalent constructions for appliances of conventional design. By the rapid shut-off action provided by the means of the invention, it is also possible to use relatively low melting point materials, such as aluminum, in forming the container 2 and associated means.

A modified heater and thermostat unit 6a is shown in FIG. 4. This unit includes a metal case 114 that has an outwardly extending rib or flange 23a provided thereon adjacent its lower end. It will be seen that the lower end 30 of the case 114 is open and is of a larger diameter than the portion of the case above the rib 23a so that an end cap 17a can be secured against a shoulder 31, formed at the vertically upper end of the rib 23a, by a spun over edge 32 of the case 114. It is a feature of the construction shown in FIG. 4 that leads 7a and 8a, extending from the metal heater and thermostat unit 6a, are suitably sealed in a porcelain disc or washer by any known type of sealing means, such as sealing bodies or masses 33 formed of glass, epoxy resins, or other suitable materials. Any desired types of leads, or connector bars 34 and 35 can extend from the sealing bodies 33 to connect to conventional terminal means provided for the unit of the invention. FIG. 4 also shows a disc-type of a thermostat 36 horizontally positioned within a tubular extension or projection 16a for control action. In such instances, the projection 16a can either be removably, or fixedly secured to the end cap or plate, and such projection may be of a greater diameter than the projection 16, but the projection 16a can be of shorter length, if desired. By this construction, the actual thermostat 36 is physically separated a greater distance from all portions of the heater means of the heater and thermostat unit than in the other units of the invention because of the horizontal positioning of the disc-type thermostat 36, which is at the lower end of the projection 16a, and is insulated therefrom. However, any suitable thermostat can be used in this sealed heater unit.

Figure 5:
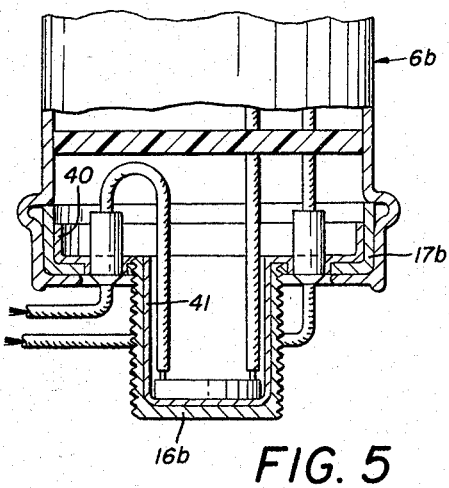
FIG. 5 is a fragmentary vertical section of a further modification of the thermostat and heater unit of the invention showing a different style of thermostat and a different type of insulating means.

A modified heater and thermostat unit 6b of the invention is shown in FIG. 5, and in this instance, the unit is very similar to that structure shown in FIG. 4, but a porcelain glaze insulation layer 40 has been provided on an end cap or plate 17b of the invention for insulation purposes. Also, a similar layer of porcelain glaze 41 is provided on the inner surface of a projection 16b suitably attached to the metal shell of the heater and thermostat unit. This porcelain glaze can be applied by dipping the end cap and projection into a porcelain forming material, with proper parts of the end cap and projection masked, and then after deposit of the porcelain material thereon, conventional operations are followed for setting the porcelain material to final form on the inner surfaces of these members. Sealed leads extend into the unit of the invention, as in the embodiment of the invention FIG. 4.

Figure 6:
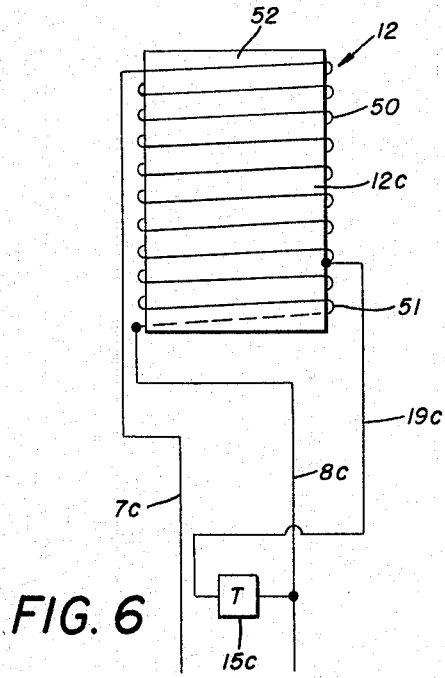
FIG. 6 is a diagrammatic wiring diagram of a thermostat and heater unit of the invention showing the operative electrical connections that may be made therein.

FIG. 6 indicates the fact that a thermostat 15c is used with a heater 12c that is divided into an upper coil 50 and a lower coil 51 on a heater core 52. Thus two leads 7c and 19c connect to the upper coil 50, and the leads 8c and 19c connect to the lower coil in the heater unit. The thermostat hence is connected between the power supply lead 8c and the common lead 19c for two heater coils so that, under normal heating conditions, the thermostat 15c is closed and provides a shunt around the high resistance, low wattage heater, but when a predetermined temperature is established in the heater and control unit then the thermostat opens to provide a power supply circuit to the heater coil 51. For example, the capacities of the heating coils 50 and 51 may be, respectively, 600 and 50 watts, so that when the 50 watt heating coil is placed in the circuit, it controls the amount of current flow through the heater coils 50 and 51. This is because the coils 50 and 51 then are in series connection and a limited and continuing heat power supply is available through the heater and thermostat unit of the invention for maintaining coffee, for example, at a desired keep warm temperature.

Figure 7:
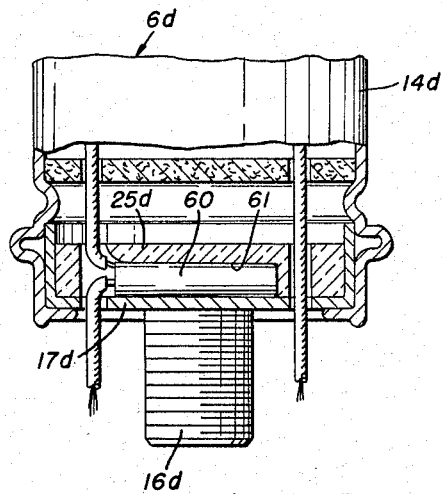
FIG. 7 is a fragmentary vertical section, like FIG. 4, of yet a further modification of the invention showing a different position for the control thermostat in the unit of the invention.

FIG. 7 shows yet another form of the invention where a thermostat and heater unit 6d is shown. In this instance, an end cap 17d has a suitable porcelain or other insulating disc 25d received therein. A thermostat 60, which is of substantially conventional design, but may be a thermostat of small size as is made by some companies today, is received within a recess 61 provided in the lower face of the porcelain disc 25d. Thus in the present instance, a projection or stud 16d attached to the end cap 17d and extending downwardly therefrom can be of a solid construction and may be welded or otherwise suitably affixed to or formed integrally with the end cap 17d. The thermostat 60 will be connected in a control circuit, as in the other embodiments of the invention, such as that shown in FIGS. 1 through 3 and any suitable amount of insulation means, or insulating dead air space can be provided between the thermostat 60 and the operative portion of the heater means provided within the metal case 14d of this unit of the invention.

While one typical control circuit has been shown in FIG. 6 of the drawings, it should be realized that other electrical energization circuits may be provided for the heater 12, or equivalents in the units of the invention. The thermostat or other control member 15 used may be connected to a single heater circuit so as to cycle a fixed wattage heater from closed to open condition and back again to provide a cycling, low heat supply to the container and its contents, this action to occur when the thermostat, or control means has reached its calibrated temperature.

In connection with the type of control means used in the circuit, in some instances it may be desirable to provide a control fuse in this control circuit for the heater, usually in series with the thermostat, to insure a positive shut-off action for power supply to the heater should undesirably high temperature be provided therein. Any suitable thermostat may be used as the thermal control in the novel heater and control units of the invention.

It should be realized that the heater and thermostat unit 6 have, in effect, an integral enclosure assembly provided therefor by the metal case 14, the metal end disc or plate 17, and metal projection or stud 16 so that a good heat source-temperature control relation is provided from the metal case 14 to the end disc 17 and stud 16. The thermostat is positioned within such integral enclosure assembly.

It will be realized that the thermostat 15 is normally at or below the temperature of any portion of the metal case 14 inasmuch as it is spaced from and insulated with relation to the heater unit or element in the unit of the invention, and such factor is considered in setting up the control characteristics of the thermostat.

In FIG. 8, a suitable plastic container 1e is shown that has any desired type of a base 3e attached thereto by a nut 5e. The nut 5e engages a stud or projection 16e affixed to a heater unit 6e. A thermostat, not shown, is received within the hollow stud 16e and is immediately adjacent the walls thereof to sense the temperature within the base 3e. The heater unit 6e is suitably secured to a bottom plate 70 that is attached in a known manner to the container 1e, which may be made from any suitable material. The heat sink nut 5e can be changed in size and mass to aid in calibrating the control thermostat, and a nut 11e likewise may be changed in size and mass to aid in such calibration.

The canopy or heat pump is loosely carried by the heater case. The thermostat is preferably carried by the hollow stud and is positioned at least substantially completely within the stud 16, or equivalent, in preferred forms of the invention.

The unit of the invention may have other uses, such as a charcoal starter, or the like, where the heater is secured to a support or handle member in any suitable manner and the thermostat will control power supplied to the heater dependent upon its temperature.

From the foregoing it will be seen that the stud 16 (and the thermostat 15 therein) in a normally operating coffee percolating installation is largely isolated thermally from the heater by its downwardly projecting position and by the insulating means and dead air space in the bottom of the heater area. The stud 16 (and the fixed temperature thermostat therein) is therefore responsive thermally essentially to the temperature of the air space, or oven in the bottom of the appliance. The liquid temperature is therefore sensed by indirection, i.e., by sensing the oven or air space below the heated liquid, a temperature which lags the liquid temperature by only a few degrees, and in fact almost exactly equals the stabilization temperature of the liquid after the action of the thermostat. For example, a thermostat calibrated at 185° F. located in the hollow stud will attain its calibrated opening temperature when the water temperature of the liquid is 190° F. or 192° F. in a proper installation in a coffee percolator or the like. Thereafter, such a fixed temperature thermostat will cycle on and off, until the temperature of the water and the oven temperature stabilize at 185° F. and therefore continues at such temperature.

From the foregoing, it is believed that a novel and improved heater and thermostat unit has been provided and that the objects of the invention have been achieved.

While several complete embodiments of the invention have been disclosed herein, it will be appreciated that modification of such particular embodiments of the invention may be resorted to without departing from the scope of the invention, as defined in the appended claims.

What is claimed is:

1. A combined electric heater and thermostat unit adapted for immersion in a liquid for controlling heating thereof comprising a metal case having a closed top and an open lower end,
a wire resistor means positioned in said case adjacent said top,
a metal heater end disc having a downwardly extending tubular closed end projection thereon secured to the lower end of said metal case in contact therewith, said metal case being adapted to be positioned with said projection out of contact with the liquid in which said electric heater and thermostat unit is immersed,
an insulating member of substantially the same area as the interior of said metal case extending thereacross intermediate said open end and said wire resistor means,
a thermostat positioned completely within and adjacent the wall of said projection to be primarily controlled by the temperature thereof and having a pair of leads extending therefrom,
said wire resistor means being connected in series with said thermostat to control power supply to said wire resistor means, and
insulation means separating said projection and said thermostat.

2. In combination in an electrical appliance,
a container having a bottom and including a cylindrical support base means and a combined electrical heater and thermostat unit attached to the bottom of said container, said unit comprising a metal case having a closed upper end and an open lower end, an electrical heater means positioned in said case, an end plate secured to the open end of said metal case in contact therewith, an externally threaded tubular projection secured to said end plate and extending downwardly therefrom, a metal nut engaging said projection to secure said support base means thereto to form an enclosure around said projection, insulation means of substantially the area of said case extending thereacross and separating said projection from said heater means to reduce heat flow therebetween, and a thermostat positioned within and carried by said projection, said thermostat being adjacent the wall of said projection to be primarily controlled by the temperature of such projection and its related enclosure ambient temperatures, said metal nut being substantially at the ambient temperature of said enclosure and being variable in mass to act as a heat sink and provide adjustment in the action of said thermostat, said thermostat being operatively connected to said heater means and the power supply means therefor to control power supply to said heater means.

3. In combination in an electrical appliance, a container having a bottom and including a cylindrical support base means and a combined electrical heater and thermostat unit attached to the bottom of said container and extending upwardly into said container, said unit comprising a metal case having a closed upper end and an open lower end, an electrical heater means positioned in said case, an end plate secured to the open end of said metal case in contact therewith, a tubular projection secured to said end plate and extending downwardly therefrom below said container, means engaging said projection to secure said support base means thereto to form an enclosure around said projection, insulations means of substantially the area of said case extending thereacross and separating said projection from said heater means to reduce heat flow therebetween, and a thermostat positioned at least substantially completely within, and carried by, said projection, said thermostat substantially filling said projection to be primarily controlled by the temperature of such projection and its related enclosure ambient temperatures, said thermostat being operatively connected to said heater means and the power supply means therefor to control power supply to said heater means.

4. In combination in an electrical appliance, a container having a bottom and including a cylindrical support base means and a combined electrical heater and thermostat unit attached to the bottom of said container, said unit comprising a metal case having a closed upper end and an open lower end, an electrical heater means positioned in said case spaced from said open end, an end plate secured to the open end of said metal case in contact therewith, a hollow projection secured to said end plate and extending downwardly therefrom, means engaging said projection to secure said support base means thereto to form an enclosure around said projection, insulation means of substantially the area of said case extending thereacross and separating said projection from said heater means to reduce heat flow therebetween and to provide a dead air insulation space below said heater means, and an elongate thermostat carried by said projection with the major portion of the length of said thermostat positioned within said projection, said thermostat being adjacent a wall of said projection to be primarily controlled by the temperature of such projection and its related enclosure ambient temperatures.

said thermostat being operatively connected to said heater means and the power supply means therefor to control power supply to said heater means.

5. A combined electrical heater and thermostat unit comprising a metal case having a top forming a closed end and having an open end, an electrical heater means positioned in said case adjacent said top, a metal end plate having a tubular closed lower end threaded projection thereon secured to the open end of said metal case, a thermostat positioned in said projection and having a pair of leads extending therefrom, said heater means having a pair of leads extending therefrom and being connected in series with said thermostat whereby only two leads extend from said unit for power supply thereto, and a metal nut carried by said projection to aid in securing the electrical heater and thermostat unit to a member whereby the volume of metal in the nut acting as a heat sink can be varied to provide adjustment in the operating action of said thermostat.

6. A combined electrical heater and control unit comprising a metal case having a closed end and an open end, an electrical heater means positioned in said case adjacent said closed end thereof, a metal end disc having a hollow metallic stud thereon secured to the initially open end of said metal case, said stud extending axially away from said case, and a thermal control operatively carried by and at least primarily within said stud immediately adjacent the walls thereof to be primarily controlled by the temperature of said stud, said heater means being connected to said thermal control to control power supply to said heater means and to require usually only two power supply leads extending from said metal case, said case having means therein forming an insulating space extending thereacross between said heater means and said end disc.

7. A combined electrical heater and thermostat unit adapted for immerision in a liquid for controlled heating thereof comprising a metal heater case having a closed end and an open end, an electrical heater means positioned in said heater case, and end disc having a removable hollow stud thereon of smaller diameter than said heater case secured to the initially open end of said heater case in contact therewith and extending axially from said heater case, and a thermostat carried by said end disc and at least primarily within said hollow stud and substantially completely filling said stud to be primarily controlled by the stud temperature, said heater means being operatively connected to said thermostat to control power supply to said heater means;

said thermostat having a metal enclosure case with one permanently closed end and with one initially open end, a terminal means extending from said open end, and thermostat being positioned to extend at least substantially axially of said stud with said initially open end of said metal enclosure case being spaced farther from said metal heater case than said permanently closed end of the thermostat enclosure case.

8. A combined electrical heater and thermostat unit for attachment to a bottom of a liquid container to extend upwardly and downwardly therefrom,
- a metal case having a closed upper end and an open lower end,
- a wire means positioned in said case adjacent said closed end and having a pair of leads extending therefrom,
- an end plate having a tubular closed end projection thereon secured to the open end of said metal case and being in contact therewith, said projection having a threaded periphery and being adapted to be positioned below the bottom plate of said liquid container to aid in securing a support base thereto,
- a thermostat at least substantially completely received in and carried by said projection adjacent a wall thereof to sense the temperature thereof and of the air surrounding the projection, and
- means engaging the threaded periphery of said projection to aid in attaching the unit to a liquid container,
- said wire heater means being operatively connected to said thermostat with only two leads extending from said unit for power supply thereto.

9. A combined electrical heater and control unit comprising
- a metal case having a closed end and an open end and adapted to be vertical when operatively positioned,
- an electrical heater means positioned in said case adjacent said closed end thereof,
- a metal end disc having a hollow metallic stud thereon secured to the initially open end of said metal case, said stud extending axially downwardly away from said case and being of smaller diameter than said case, and
- a thermostat operatively positioned within said stud to be primarily controlled by the temperature of said stud and said metal case at the open end thereof,
- said heater means being connected to said thermostat to control power supply to said heater means and to require only power supply leads to extend from said metal case,
- said case having means therein forming a dead air insulating space between the lower end of said heater means and said end disc.

10. A combined electric heater and thermostat unit adapted for immersion in a liquid in a container for controlled heating thereof comprising
- a metal case having a closed top and an open lower end and being adapted to be positioned in a container with the metal case open end engaging said container at a bottom portion thereof,
- a wire resistor means positioned in said case adjacent said top,
- a metal heater end disc having a downwardly extending tubular closed end metal projection thereon secured to the lower end of said metal case in contact therewith, said projection being appreciably smaller in diameter than said metal case to permit a pair of leads to extend through said end disc,
- an insulating member of substantially the area of said metal case extending across said metal case intermediate said open end and said wire resistor means,
- an insulating disc associated with said end disc,
- a thermostat positioned with at least the major portion thereof within said projection to be primarily controlled by the temperature thereof,
- a pair of power supply leads extending through said insulating disc into said metal case and being in sealed engagement with said insulating disc,
- leads connecting said wire resistor means in series with said thermostat and power supply leads to control power supply to said wire resistor means, and
- insulation means separating the walls of said projection and said thermostat.

11. A combined electric heater and thermostat unit adapted for immersion in a liquid in a container for controlled heating thereof comprising
- a metal case having a closed top and an open lower end and being adapted to be positioned in a container with the metal case open end engaging said container,
- a wire resistor means positioned in said case adjacent said top,
- a metal heater end disc having a downwardly extending tubular closed end projection thereon secured to the lower end of said metal case in sealed contact therewith, said projection being appreciably smaller in diameter than said metal case to permit a pair of leads to extend through said end disc and being adapted to engage a support base for the container to form a base enclosure around said projection,
- an insulating member of substantially the area of said metal case extending across said metal case intermediate said open end and said wire resistor means to reduce heat flow therebetween,
- a thermostat at least substantially completely positioned in said projection to be primarily controlled by the temperature thereof as affected by the air within the base enclosure, said thermostat having a case of about the same cross sectional area as the inner cavity formed by said projection snugly received therein, and
- a pair of power supply leads extending through said end disc into said metal case and connected to said wire resistor means and to said thermostat,
- said wire resistor means being connected in series with said thermostat to control power supply to said wire resistor means.

12. In combination in an electrical appliance,
- a container including enclosed support base means and a combined electrical heater and thermostat unit a portion of which is adapted for immersion in any liquid in said container for controlled heating thereof, said unit comprising
- a metal case having a closed end and an open end,
- an electrical heater means positioned in said case,
- an end disc having an externally threaded tubular closed lower end projection thereon secured to the open end of said metal case in contact therewith, said projection engaging said support base means for said unit which support forms an enclosure around said projection,
- insulation means of substantially the area of said case extending thereacross and separating said projection from said heater means to reduce heat flow therebetween, and
- a thermostat primarily positioned in and carried by said projection, said thermostat being adjacent the wall of said projection to be controlled by the temperature of such projection and its related enclosure ambient temperatures,
- said heater means being operatively connected to said thermostat to control power supply to said heater means.

13. In combination, a liquid container and a combined electrical heater and thermostat unit attached to a bottom of the liquid container to extend upwardly and downwardly therefrom, said unit comprising
- a metal case having a closed end and an open end,
- a wire heater means positioned in said case adjacent said closed end and having a pair of leads extending therefrom,
- an end plate having a tubular closed end projection thereon secured to the open end of said metal case and being in contact therewith, said projection having a threaded periphery and being adapted to be positioned below the bottom of said liquid container to aid in securing a support base thereto, a thermostat at least substantially completely received in and carried by said projection to sense the temperature of the air surrounding the projection, said wire heater means being operatively connected to said thermostat with only two leads extending from said unit for power supply thereto, and a base for said container attached to said projection and forming an enclosure therearound.

14. A combined electrical heater and control unit comprising a metal case having a closed end and an open end, an electrical heater means positioned in said case adjacent said closed end thereof and spaced from the open end of said case, a metal end disc having a hollow metallic stud thereon secured to the initially open end of said metal case, said stud extending axially away from said case, and a thermostat operatively carried by and positioned primarily within said stud immediately adjacent the walls thereof to be primarily controlled by the temperature of said stud, said heater means being connected to said thermostat to control power supply to said heater means and to require usually only two power supply leads extending from said metal case, and means forming an insulating space extending across said case between said heater means and said end disc.

15. In combination, a liquid container and a combined electrical heater and thermostat unit attached to a bottom of the liquid container to extend upwardly thereinto and downwardly therefrom, said unit comprising a metal case having a closed end and an open end, a wire heater means positioned in said case adjacent said closed end and having a pair of leads extending therefrom, an end plate having a projection thereon secured to the open end of said metal case and being in contact therewith, said projection having a threaded periphery and being adapted to be positioned below the bottom of said liquid container to aid in securing a support base thereto, a thermostat operatively positioned within said metal case at the open end thereof and positioned on said end plate and in heat exchange relation with said end plate and projection to sense the temperature of the air surrounding such case end, insulation means of substantially the same area as the interior of said metal case positioned therein and extending thereacross intermediate said wire heater means and said thermostat, said wire heater means being operatively connected to said thermostat for controlled power supply to said heater means by a circuit including said thermostat, and a base for said container attached to said projection and forming an enclosure around said projection and said metal case open end.

16. A combined electric heater and thermostat unit as in claim 15 where an insulating member, having a recess in the lower face thereof, extends across said metal case immediately above said end plate, and said thermostat being positioned in said recess and supported on said end plate.

17. A combined electric heater and thermostat unit adapted for immersion in a liquid for controlling heating thereof comprising a metal case having a closed top and an open lower end, a wire resistor means positioned in said case, a metal heater end means having a downwardly extending tubular closed end projection thereon secured to the lower end of said metal case in contact therewith, said metal case being adapted to be positioned with said projection out of contact with the liquid in which said electric heater and thermostat unit is immersed, an insulating member of substantially the same area as the interior of said metal case extending thereacross intermediate said open end and said wire resistor means, and a thermostat positioned at least primarily within said projection adjacent the wall thereof to be primarily controlled by the temperature thereof and having a pair of leads extending therefrom, said wire resistor means being connected in series with said thermostat to control power supply to said wire resistor means.

References Cited by the Examiner

UNITED STATES PATENTS

| | | | |
|---|---|---|---|
| 1,507,587 | 9/1924 | Curtiss | 219—481 |
| 1,733,145 | 10/1929 | Xardell | 219—434 X |
| 1,750,907 | 3/1930 | Skold | 219—328 X |
| 1,848,449 | 3/1932 | Wiegand | 219—437 |
| 1,943,386 | 1/1934 | Johnson | 99—281 |
| 2,702,337 | 2/1955 | Drumm | 219—436 X |
| 2,719,212 | 9/1955 | Kircher | 219—536 |

ANTHONY BARTIS, *Primary Examiner.*